US006819784B1

United States Patent
Sabatini et al.

(10) Patent No.: US 6,819,784 B1
(45) Date of Patent: Nov. 16, 2004

(54) METHOD OF AND SYSTEM FOR COMPENSATING FOR INJECTION GRADIENT IN A CAPACITIVE SENSING CIRCUIT ARRAY

(75) Inventors: Marco Sabatini, Kensington, CA (US); Frederic Raynal, Berkeley, CA (US); Giovanni Gozzini, Berkeley, CA (US)

(73) Assignee: Upek, Inc., Berkeley, CA (US)

( * ) Notice: Subject to any disclaimer, the term of this patent is extended or adjusted under 35 U.S.C. 154(b) by 0 days.

(21) Appl. No.: 09/542,440

(22) Filed: Apr. 4, 2000

(51) Int. Cl.[7] .................................................. G06K 9/00
(52) U.S. Cl. ........................................................ 382/124
(58) Field of Search ................................. 382/124–127

(56) References Cited

U.S. PATENT DOCUMENTS

| | | | | |
|---|---|---|---|---|
| 4,567,387 A | * | 1/1986 | Wacyk | 327/51 |
| 5,006,819 A | * | 4/1991 | Buchan et al. | 331/1 A |
| 5,126,588 A | * | 6/1992 | Reichmeyer et al. | 327/108 |
| 5,299,312 A | * | 3/1994 | Rocco, Jr. | 714/4 |
| 5,615,169 A | * | 3/1997 | Leung | 365/233.5 |
| 5,717,346 A | * | 2/1998 | Gould et al. | 326/93 |
| 5,861,583 A | * | 1/1999 | Schediwy et al. | 178/18.06 |
| 6,011,441 A | | 1/2000 | Ghoshal | 331/55 |
| 6,011,859 A | * | 1/2000 | Kalnitsky et al. | 382/124 |
| 6,438,257 B1 | * | 8/2002 | Morimura et al. | 382/124 |

FOREIGN PATENT DOCUMENTS

EP     0 790 479 A1     8/1997     ............ G01B/7/00

OTHER PUBLICATIONS

Marco Tartagni, Roberto Guerrieri, A 390dpi Live Fingerprint Imager Based on Feedback Capacitive Sensing Scheme, 1997, IEEE, 200–202.*
Marco Tartagni, Roberto Guerrieri, A Fingerprint Sensor Based on the Feedback Capacitive Sensing Scheme, Jan. 1998, IEEE, Volum 33, 133–142.*
Pedram Massoud, "Power Minimization in IC design: Principles and Applications," Jan. 1996, ACM Transactions on Design Automation of Electronic Systems, vol. 1 No. 1, pp. 3–56.*

* cited by examiner

Primary Examiner—Daniel Mariam
Assistant Examiner—Shefali Patel
(74) Attorney, Agent, or Firm—O'Melveny & Myers LLP

(57) ABSTRACT

A fingerprint sensor includes an array comprising a plurality of capacitive pixel cells. Each of the capacitive pixel cells includes a pair of metal plates and a reset transistor. The reset transistor includes a gate, a source connected to one of the metal plates and a drain connected to the other of the metal plates. A reset buffer generates a reset signal. A regenerator is associated with each reset transistor of each capacitive pixel cell. The regenerator regenerates the reset signal received from the reset buffer to eliminate injection gradient over the array.

15 Claims, 3 Drawing Sheets

METHOD OF AND SYSTEM FOR COMPENSATING FOR INJECTION GRADIENT IN A CAPACITIVE SENSING CIRCUIT ARRAY

FIELD OF THE INVENTION

The present invention relates generally to the field of methods of and system for capturing fingerprint images, and more particularly to a method of and system for compensating for injection gradient in a capacitive fingerprint sensing circuit array.

DESCRIPTION OF THE PRIOR ART

Fingerprint recognition has been suggested for use in many security applications, such as controlling access to buildings, computers, or the like. Fingerprint recognition systems enable a user to access the controlled facility without having to provide a device such as a keypad or card reader, and without having the user memorize a password, or other personal identification number, or carry a card key.

An important element of a fingerprint recognition system is a sensing device. An example of a sensing device is the TouchChip (TM) Silicon Fingerprint Sensor, which is available from STMicroelectronics, Inc. The TouchChip uses an active pixel array based upon a capacitive feedback sensing circuit. The array comprises 360 rows and 256 columns of cells that represent pixels. Each pixel cell contains a high-gain amplifier connected to two adjacent top metal plates separated from the skin surface by an ultra-hard protective coating. The amplifier input is connected to one of the top metal plates and the inverter output is connected to the other top metal plate. The cell provides a charge integrator whose feedback capacitance is the effective capacitance between the two top metal plates.

When a finger is placed on the sensor, the surface of the skin over a pixel cell acts as a third plate separated from the two adjacent plates by a dielectric layer composed of air. Because fingerprint valleys will be farther from the sensor surface than fingerprint ridges, pixel cells beneath valleys will have more distance between their top metal plates and the skin surface than pixel cells under ridges. The thickness of the dielectric layer modulates the capacitive coupling between the top metal plates of the pixel cell so that top metal plates under valleys will exhibit different effective capacitance than top plates under ridges.

The pixel cell works in three phases. The first phase is a RESET, in which the input and output of the charge integrator pixel cells through a CMOS reset transistor driven by a reset signal. The second phase disconnects the output and input plates by asserting to ground the reset signal that drives the reset transistor. By opening the reset transistor switch, channel charge is injected into both the input and output plates. During the third phase, a fixed charge is applied to the charge integrator input, which causes an output voltage swing inversely proportional to the feedback capacitance, which is the effective capacitance between the top metal plates. Since the distance between the skin and a pixel cell changes the effective feedback capacitance of the charge integrator, the output of pixel cells under ridges will be different from the output of pixel cells under valleys.

Returning to the concept of injection, when the reset transistor is active or on, there is a conduction path channel that extends from the source to the drain of the reset transistor. When the gate voltage decreases, to switch off the reset transistor, mobile carriers are drained out of the channel through both the source and drain ends. The amount of channel charge that is injected into the input offsets the output of the charge integrator modifying the background of the image. The amount of charge injection depends on several factors. These factors include the slope of the signal applied on the gate, the input/output capacitance ratio, and the size of the reset transistor itself.

The reset signal is driven by a common buffer located at the top of the array. As the distance between the common buffer and the local pixel cell increases, the slope of the reset signal becomes lower due to the RC load of the line. The change in the slope of the reset signal over the length of the line causes different charge injection as the distance from the output of the buffer increases. At the top of the array, near the reset buffer, the amount of charge injected brings the pixel to its maximum saturated level giving a very dark image. Closer to the bottom on the array, the amount of injected charge decreases making the image lighter. The lighter image near the bottom of the array may cause certain fingerprint features to be less easily distinguishable, thereby resulting in inaccurate fingerprint recognition. The injection gradient problem is particularly acute in large arrays where the distance from the reset buffer to the bottom of the array is significant.

SUMMARY OF THE INVENTION

The present invention provides a capacitive fingerprint sensor and a method of capturing a fingerprint that compensates for injection gradient. The fingerrint sensor of the present invention includes an array comprising a plurality of capacitive pixel cells. Each of the capacitive pixel cells includes a pair of metal plates, a charge integrator, and a reset transistor, among other things. The reset transistor source is connected to one of the metal plates and its drain is connected to the other of the metal plates. The fingerprint sensor of the present invention includes a plurality of reset signal regenerators, there being at least one regenerator associated with each capacitive pixel cell. In the preferred embodiment, the regenerator includes an inverter. Each local inverter receives the input from the global reset line driven by the common buffer and regenerates the slope of the reset signal that controls directly the CMOS switch. The fingerprint sensor of the present invention includes a common reset buffer for generating a reset signal. The reset buffer includes an output that, through a common line, is connected to the input of each local inverter. When the reset buffer generates a reset signal, each inverter regenerates the reset signal slope at each reset transistor of each capacitive pixel cell, thereby equalizing the reset signal slope and so the injection, for every pixel cell. This, therefore, compensates for injection gradient along the column of the array of capacitive pixel cells.

DESCRIPTION OF THE PREFERRED EMBODIMENT

Figure 1:
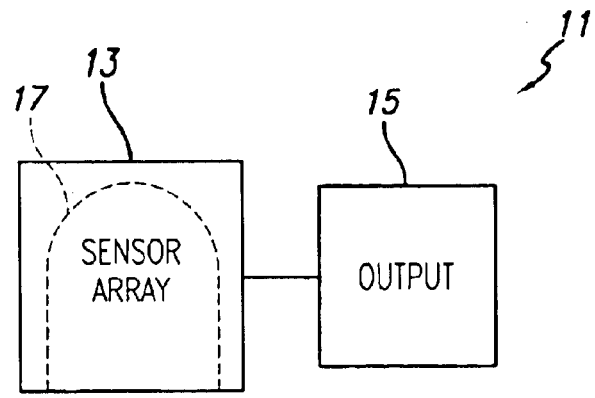
FIG. 1 is a block diagram of a fingerprint detection system according to the present invention.

Referring now to the drawings, and first to FIG. 1, a fingerprint detector according to the present invention is designated generally by the numeral 11. Fingerprint detector 11 includes a sensor array 13 and a suitable out indicated generally at 15. As will be explained in detail hereinafter, sensor array comprises a rectangular array of a plurality of capacitive pixel cells arranged in rows and columns. In the preferred embodiment, the capacitive pixel cells are on a pitch of about 50 microns, which corresponds to a resolution of about 508 dpi. As shown in FIG. 1, sensor array is sized to capture an image of a fingerprint of finger 17 placed thereon. Sensor array 13 is preferably fabricated on a single semiconductor chip.

Figure 2:
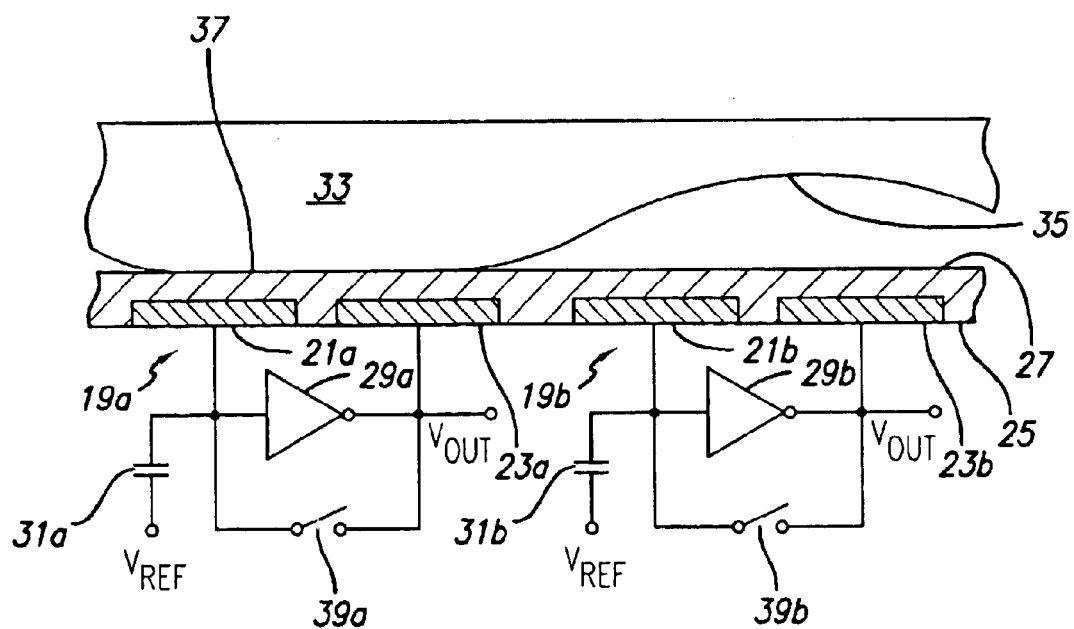
FIG. 2 illustrates the physical structure and electrical operation of individual capacitive pixel cells according to the present invention.

Referring now to FIG. 2, there is illustrated the structure and operation of a capacitive pixel cell 19 according to the present invention. The cell of the preferred embodiment of the present invention is of the disclosed in Tartagni, U.S. patent application Ser. No. 08/799,548, filed Feb. 13, 1997, titled Capacitive Distance Sensor, the disclosure of which is incorporated herein by reference. Each cell 19 includes a first conductor plate 21 and a second conductor plate 23 supported on a semiconductor substrate, which is preferably a conventional silicon substrate that may have a conventional shallow epitaxial layer defining an upper surface region thereof. The top surface of the substrate includes an insulating layer 25. Insulating layer 25 is preferably an oxide layer, which may be a conventional thermally grown silicon dioxide layer. Conductor plates 21 and 23 are covered by a protective coating 27 of a hard material, which protects cell 19 from moisture, contamination, abrasion, and electrostatic discharge.

Each cell 19 includes a high-gain-inverting amplifier 29. The input of inverting amplifier 29 is connected to a reference voltage source $V_{REF}$ through an input capacitor 31. The output of inverting amplifier 29 is connected to an output $V_{OUT}$. The input of inverting amplifier 29 also connected to conductor plate 21 and the output of inverting amplifier 29 is connected to conductor plate 23, thereby creating a charge integrator whose feedback capacitance is the effective capacitance between conductor plates 21 and 23.

When a finger 33 is placed on the surface of protective coating 27, the surface of the skin over each cell 19 acts as a third capacitor plate separated from adjacent conductor plates 21 and 23 by a dielectric layer that includes protective coating 27 and a variable thickness of air. Because fingerprint valleys 35 will be farther from conductor plates 21 and 23 than fingerprint ridges 37, cells 19 beneath valleys 35 will exhibit a different effective capacitance between their conductor plates 21 and 23 and the skin surface than cells 19 under ridges 37. The thickness of this dielectric layer will modulate the capacitance coupling between plates 21 and 23 of each cell 19. Accordingly, cells 19 under valleys 35 will exhibit a different effective capacitance than cells 19 under ridges 37.

Cells 19 works in three phases. During the first phase, the charge integrator is reset with a switch 39 by shorting the input and output of inverting amplifier 29. Preferably, switch 39 is a reset transistor having a source connected to the input of inverting amplifier 29 and a drain connected to the output. The input and output are shorted by applying a reset voltage on the gate of a reset transistor. The second phase disconnects the output and input by opening switch 39 by applying the ground on the gate of the reset transistor. The application of the ground to the gate of the reset transistor causes a phenomenon called injection in which charges are injected into both the input and output plates. During the third phase, a fixed charge is applied to the charge integrator input, which causes an output voltage swing inversely proportional to the feedback capacitance, which is the effective capacitance between conductor plates 21 and 23. For a fixed amount of input charge, the output of inverting amplifier 19 will range between two extremes depending on charge injection and the effective feedback capacitance value. The first extreme is a saturated voltage level if the effective feedback capacitance is very small. The second extreme is a voltage close to the logical threshold, which is less than the reset value, when the effective feedback capacitance is large.

During the first phase, when the reset transistor of switch 39 is active or on, there is a conduction path channel that extends from the source to the drain of the reset transistor. During the second phase, when the gate voltage on the reset transistor decreases, mobile carriers are drained out of the channel through both the source and drain ends. The percentage of channel charge that is injected into the input, with respect to the total channel charge, depends on several factors. These factors include the slope of the signal applied on the gate, the input/output capacitance ratio, and the size of the reset transistor itself. This charge injected at the input of the pixel charge integrator overlaps to the input signal and modifies the output of the pixel cell.

Figure 3:
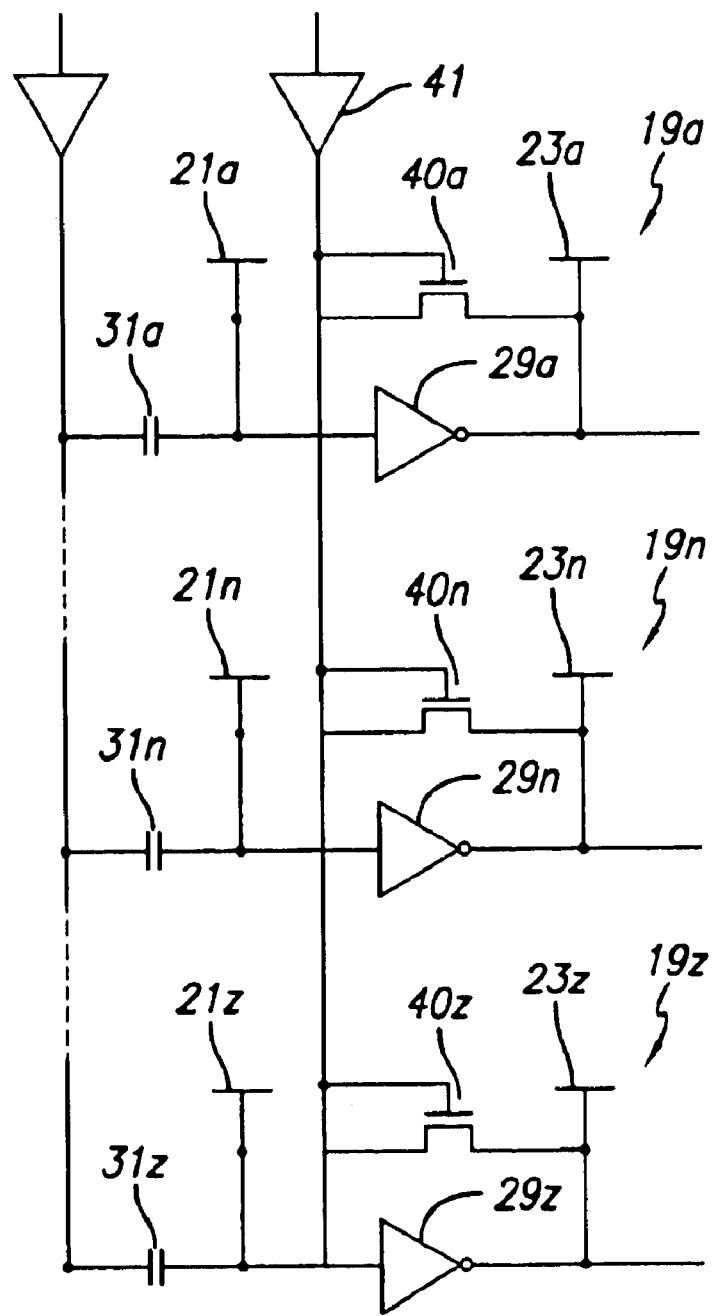
FIG. 3 is a block diagram of a column of an array of capacitive pixel cells according to the prior art.

Referring now to FIG. 3, there is shown a column of a sensor array of the prior art. The reset signal is driven by a reset buffer 41 located at the top of the array. As the distance increases from the output of reset buffer to a reset transistor 40, the slope of the reset signal becomes lower due to the RC load of the line. The change in the slope of the reset signal over the length of the line causes less charge injection as the distance from the output of the buffer increases. At the top of the array, near the reset buffer, the amount of charge injected brings the pixel to its maximum saturated level giving a very dark image. Closer to the bottom of the array, the amount of injected charge decreases making the image lighter. The lighter image near the bottom of the array may cause certain fingerprint features to be less easily distinguishable, thereby resulting in inaccurate fingerprint recognition.

Figure 4:
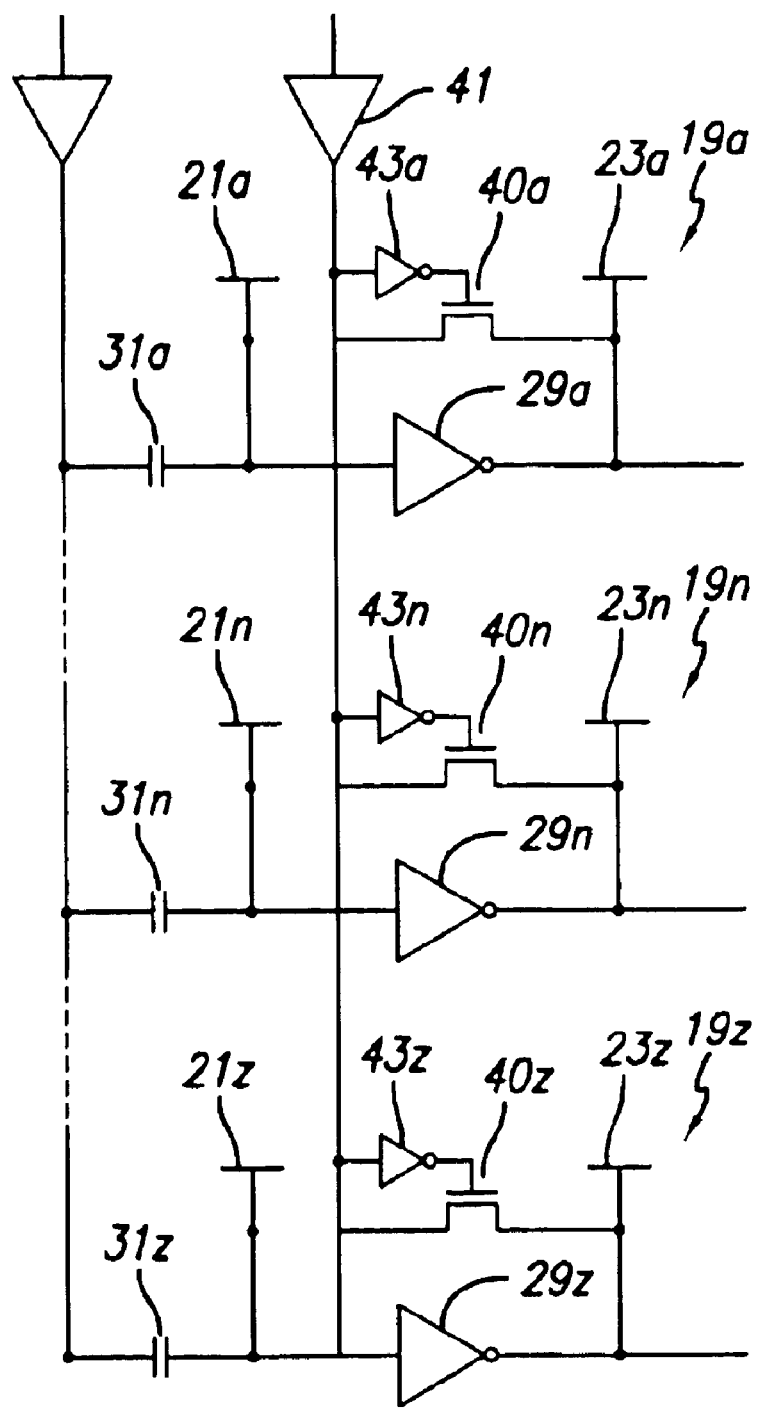
FIG. 4 is a block diagram of a column of an array of capacitive pixel cells with injection gradient compensation according to the present invention.

Referring now to FIG. 4, there is shown a column of a sensor array according to the present invention. The column of the present invention is generally similar to column of FIG. 3, with like reference characters applied to like elements. However, the column of the present invention includes means for regenerating the reset signal slope at the reset transistor 40 of each cell 19. In the illustrated embodiment of the present invention, the regeneration means comprises an inverter 43 associated with each reset transistor 40. When the reset signal from reset buffer 41 is applied to the input of an inverter 43, an inverted reset signal is applied to the gate of reset transistor 40. The slope of the inverted reset signal applied to each reset gate 40 will be the same even though the slope of the reset signal received at each inverter 43, will be different. Thus, the charge injected at each cell 19 will be the same. Accordingly, the array of the present invention is not subject to the injection gradient problem of the prior art.

Those skilled in the art will recognize that appropriate design steps must be taken in order to account for the inversion of the reset signal at inverter 43. When the reset signal is asserted it must cause reset,transistor 40 to conduct. One solution is to connect two inverters 43 in series to the gate of each reset transistor 40 if there is available space. Alternative solutions include using a single inverter 43 with an inverted reset signal or with a p-channel reset transistor 40.

The present invention has been described and illustrated with reference to a presently preferred embodiment. Those skilled in the art, given the benefit of the foregoing disclosure will recognize alternative embodiments. Accordingly, the foregoing disclosure is intended for purposes of illustration and not of limitation.

What is claimed is:

1. A fingerprint sensor, which comprises:
  a capacitive pixel cell, said capacitive pixel cell including a pair of metal plates and a reset transistor, said reset transistor including a gate, a source connected to one of said metal plates, and a drain connected to the other of said metal plates;
  an inverter including an input and an output, said output being connected to said gate of said reset transistor; and,
  a reset buffer having an output connected, through a common line, to the input of said inverter.

2. The fingerprint sensor as claimed in claim 1, including:
  a high-gain inverter having an input and an output, said input of said high-gain inverter being connected to one of said metal plates and said output of said high-gain inverter being connected to the other of said metal plates; and,
  a charge buffer having an output operably connected to the input of said high-gain inverter.

3. The fingerprint sensor as claimed in claim 2, including:
  an input capacitor connected between the output of said charge buffer and the input of said high-gain inverter.

4. A method of capturing a fingerprint image, which comprises the steps of:
  providing a plurality of capacitive pixel cells,
  each of said capacitive pixel cells comprising a pair of metal plates and a reset transistor, said reset transistor including a gate, a source connected to one of said metal plates and a drain connected to the other of said metal plates;
  generating a reset signal to said plurality of pixel cells; and,
  regenerating said reset signal to reset the reset transistor of each of said pixel cells.

5. A fingerprint sensor, which comprises:
  a plurality of capacitive pixel cells, each of said capacitive pixel cells including a pair of metal plates and a reset transistor, said reset transistor including a gate, a source connected to one of said metal plates and a drain connected to the other of said metal plates;
  an inverter connected to the gate of each reset transistor;
  a reset buffer including an output connected to each inverter.

6. The fingerprint sensor as claimed in claim 5, wherein each capacitive pixel cell includes:
  a high-gain inverter having an input and an output, said input of said high-gain inverter being connected to one of said metal plates and said output of said high-gain inverter being connected to the other of said metal plates; and,
  a charge buffer having an output operably connected to the input of said high-gain inverter.

7. The fingerprint sensor as claimed in claim 6, wherein each capacitive pixel cell further includes:
  an input capacitor connected between the output of said charge buffer and the input of said high-gain inverter.

8. A fingerprint sensor, which comprises:
  a plurality of capacitive pixel cells, each of said capacitive pixel cells including a pair of metal plates and a reset transistor, said reset transistor including a gate, a source connected to one of said metal plates, and a drain connected to the other of said metal plates; and, means for generating a reset signal;
  means for re-generating said reset signal at each of said of said capacitive pixel cells.

9. The fingerprint sensor as claimed in claim 8, wherein said means for regenerating said reset signal includes a plurality of inverters, each of said inverters including an input and an output, respective ones of the plurality of inverters each having an output connected to a corresponding gate of each said reset transistor.

10. The fingerprint sensor as claimed in claim 9, wherein each of the plurality of capacitive pixel cells further comprises a high-gain inverter connecting members of the pair of metal plates and said means for generating said reset signal includes a reset buffer having an output connected to an input of the high-gain inverter of each of said capacitive pixel cells.

11. The fingerprint sensor of claim 9, further comprising a second plurality of inverters, ones of the second plurality of inverters connected in series with corresponding ones of the plurality of inverters.

12. The fingerprint sensor of claim 9, wherein said means for generating an input signal is configured to provide an inverted input signal to each of the plurality of inverters.

13. The fingerprint sensor of claim 9, wherein said reset transistor of each of said capacitive pixel cells comprises a p-channel transistor.

14. The fingerprint sensor as claimed in claim 8, wherein each capacitive pixel cell further comprises
  a charge buffer having an output operably connected to the input of said high-gain inverter of each capacitive pixel cell.

15. The fingerprint sensor as claimed in claim 14, wherein each capacitive pixel cell further includes an input capacitor connected between the output of said charge buffer and the input of said high-gain inverter.

* * * * *